(12) United States Patent
Sellars

(10) Patent No.: US 7,578,028 B2
(45) Date of Patent: Aug. 25, 2009

(54) DEVICE FOR PROVIDING MULTI-DIRECTIONAL MOVEMENT

(76) Inventor: Robert Sellars, 5 Kelso Close, Yamanto, QLD 4305 (AU)

( * ) Notice: Subject to any disclaimer, the term of this patent is extended or adjusted under 35 U.S.C. 154(b) by 43 days.

(21) Appl. No.: 10/525,233

(22) PCT Filed: Aug. 19, 2003

(86) PCT No.: PCT/AU03/01054

§ 371 (c)(1),
(2), (4) Date: Oct. 11, 2005

(87) PCT Pub. No.: WO2004/018233

PCT Pub. Date: Mar. 4, 2004

(65) Prior Publication Data

US 2006/0101614 A1   May 18, 2006

(30) Foreign Application Priority Data

Aug. 20, 2002 (AU) ............................. 2002950873

(51) Int. Cl.
*B60B 33/00* (2006.01)
(52) U.S. Cl. .................. 16/20; 16/24; 16/35 R
(58) Field of Classification Search ........... 16/20, 16/24, 26, 35 R, 35 D; 188/1.12; 384/531–534, 384/523, 528
See application file for complete search history.

(56) References Cited

U.S. PATENT DOCUMENTS

| 600,172 | A | | 3/1898 | Rechtsteiner | |
| 956,969 | A | * | 5/1910 | Hussey | 16/24 |
| 1,356,566 | A | * | 10/1920 | Smith | 16/26 |
| 1,358,543 | A | * | 11/1920 | Hardon | 16/26 |
| 1,451,119 | A | * | 4/1923 | Schroeder et al. | 248/108 |
| 2,423,711 | A | * | 7/1947 | Knox | 16/26 |
| 2,527,639 | A | * | 10/1950 | Loether | 16/21 |
| 2,687,546 | A | | 8/1954 | Oppenheimer | |
| 2,690,584 | A | * | 10/1954 | Freddolino | 16/26 |
| 3,025,075 | A | * | 3/1962 | Batyr | 280/79.2 |
| 3,456,281 | A | * | 7/1969 | Lowry | 16/25 |
| 3,846,870 | A | | 11/1974 | Craig | |
| 3,858,673 | A | | 1/1975 | Browning | |

(Continued)

FOREIGN PATENT DOCUMENTS

AU        5084/46        11/1940

(Continued)

OTHER PUBLICATIONS

Russian Search Report for Russian Application No. 2005107709/11 dated Jul. 27, 2007.

(Continued)

*Primary Examiner*—Chuck Y. Mah
(74) *Attorney, Agent, or Firm*—Pearl Cohen Zedek Latzer, LLP

(57) ABSTRACT

A device for providing multi-directional movement comprising a housing having at least one roller located at least partially within the housing, at least one bearing means for supporting a load and configured to couple the at least one roller with the housing whereby at least one roller is able to rotate relative to the housing and a braking means for providing resistance to rotation of the at least one roller.

15 Claims, 5 Drawing Sheets

U.S. PATENT DOCUMENTS

| | | | | |
|---|---|---|---|---|
| 3,918,777 | A | * | 11/1975 | Kitchin ........................ 384/528 |
| 4,203,177 | A | * | 5/1980 | Kegg et al. ..................... 16/24 |
| 4,402,108 | A | | 9/1983 | Pannwitz |
| 4,413,693 | A | | 11/1983 | Derby |
| 4,493,513 | A | * | 1/1985 | Osawa et al. ................. 384/533 |
| 4,838,712 | A | * | 6/1989 | Kubo et al. .................. 384/523 |
| 5,068,943 | A | * | 12/1991 | Estkowski et al. .......... 16/18 A |
| 5,950,749 | A | | 9/1999 | Inoue |
| 6,200,038 | B1 | * | 3/2001 | Fierling ..................... 384/531 |
| 2003/0131444 | A1 | * | 7/2003 | Koguchi ........................ 16/24 |

FOREIGN PATENT DOCUMENTS

| | | |
|---|---|---|
| FR | 2695447 | 3/1994 |
| SU | 823211 | 4/1981 |

OTHER PUBLICATIONS

Encyclopedia "Bearing assemblies for modern machines and apparatuses" by V.B. Nosov, Moscow, "Machinebuilding", 1997, p. 333.

* cited by examiner

DEVICE FOR PROVIDING MULTI-DIRECTIONAL MOVEMENT

CROSS-REFERENCE TO RELATED APPLICATIONS

This application is a National Phase Application of PCT International Application No. PCT/AU2003/001054, International Filing Date Aug. 19, 2003, claiming priority of Australian Patent Application, 2002950873, filed Aug. 20, 2002.

FIELD OF THE INVENTION

The present invention relates to mechanical devices which are movable such as wheels.

BACKGROUND OF THE INVENTION

The problem with many wheels is that they lack multi-directional movement. For example a castor wheel of a shopping trolley, although technically able to move in many different directions is frequently difficult to move in the direction the person pushing the trolley, wishes to move.

Much of the problem with the above castor wheel is associated with pushing of the trolley rather than pulling of the trolley. Because the castor wheel is actually only able to rotate in one plane, its multi-directional movement depends upon rotation of the shaft to which it is connected.

In a similar fashion articulated joints frequently are limited to movement in one plane in a similar fashion to a typical hinge.

SUMMARY OF THE INVENTION

According to one aspect of the present invention there is provided a device for providing multi-directional movement comprising a housing having at least one main roller located therein, at least one bearing means comprising an annular member with a plurality of openings in which support rollers are located for contacting an upper surface of the or each main roller, a centring means for preventing contact between the main roller and the inner wall of the housing and comprising a plurality of centring rollers for contacting a peripheral portion of the or each main roller, a retaining means for retaining the centring means in position in the housing around the or each main roller and a braking means for providing resistance to rotation of at least one main roller.

It is preferred that the bearing means comprises a plurality of balls or rollers.

It is to be understood that the word "couple" is intended to include transferring of load from the housing to the roller.

It is preferred that the device includes a single roller.

The roller may be a spherical ball or a cylindrical roller bearing or other roller bearing.

Preferably the braking means comprises a braking member which is configured to be urged into contact with the roller.

The bearing means may include an urging means for urging the braking member in a predetermined direction.

Preferably the braking member comprises a brake pad or equivalent.

The at least one bearing means is preferably located substantially above a major portion of the roller.

Preferably the braking member is located above the roller bearing means.

The braking member may be configured to contact a top surface of the roller.

The braking means may be operable to vary the amount of braking force applied to the roller.

The urging means may be operable to apply a predetermined force to the braking member.

The urging means may comprise a spring.

Preferably the bearing means comprises a race and a plurality of roller bearings located therein.

The braking member may be able to be forced by the urging means through the race into contact with the roller.

Preferably the urging means comprises a screwable member.

The screwable member may extend vertically through a top section of the housing.

The housing preferably includes a shank and a socket portion for the roller.

The screwable member is preferably controlled by a horizontal screw through a side wall of the housing.

The housing may comprise a tubular portion configured to receive the roller.

The tubular portion preferably has a plurality of stepped regions on its inner surface.

The device preferably includes a centring means for reducing frictional contact between the roller and an adjacent inner peripheral surface of the housing.

The centring means may comprise a peripheral race with a plurality of roller bearings configured to contact a circumferential or peripheral portion of the roller.

It is preferred that the device includes a retaining means for retaining the centring means in position around the peripheral portion of the roller.

Preferably the retaining means comprises a circlip.

The housing may include a first annular region which houses the centring means.

It is preferred that the housing includes a second region which houses the bearing means.

Preferably the second annular region has a smaller radius than the first annular region.

The bearing means preferably comprises an annular member having a plurality of openings in which support rollers are located for contacting an upper surface of the or each roller.

The or each one of the support rollers may be adapted to be seated in the openings so that part of their surfaces protrude downwardly beyond the outer lower surface of the annular member.

Preferably the openings each comprise a hole through the annular member, which has a diameter which reduces in size to a minimum, which is less than the width of the roller bearing located therein.

It is preferred that each roller bearing when located in a respective hole protrudes beyond top and bottom faces of the annular member.

The housing preferably has a vertical shaft through which the urging member is located.

The housing may comprise a socket with an elongate portion extending axially from its top surface and the roller located in its open bottom surface.

According to an alternative embodiment the device comprises a plurality of rollers each having one bearing means.

It is preferred that the device comprises four rollers with each roller having a bearing means contacting a top surface thereof.

Preferably the device includes a central power transfer means with the rollers equispaced therearound.

The device preferably includes a peripheral race with bearings which are configured to contact outer surfaces of the rollers.

The central power transmission means may comprise a drive shaft or ball.

Each roller may be located in a recessed area and confined to rotation within that recessed area.

It is preferred that the roller is able to move in any direction.

Preferably the roller provides universal movement for the device.

Preferably the housing comprises a tubular sleeve located around the shaft.

According to another embodiment the roller includes a central bore with an axle therethrough.

The device may include a plurality of bearing means.

Preferably the device includes left and right side bearing means.

Each left and right side bearing means preferably comprises an annular member having roller bearings housed in equispaced holes thereof.

The device preferably includes left and right centring means located on opposite sides of the roller.

It is preferred that the braking means is located above and/or below the roller.

The braking means preferably includes a spring.

The roller may be a cylindrical roller bearing.

According to one aspect of the present invention there is provided an apparatus having a housing with at least one roller located at least partially within the housing, at least one bearing means for supporting a load and configured to couple the at least one roller with the housing whereby at least one roller is able to rotate relative to the housing and braking means for providing resistance to rotation of the at least one roller.

According to another aspect of the present invention there is provided an apparatus comprising a housing having at least one roller located at least partially within the housing, at least one bearing means for supporting a load and configured to couple the at least one roller with the housing whereby at least one roller is able to rotate relative to the housing with the bearing means comprising a plurality of rollers.

It is preferred that either of the above apparatuses have one or more of the preferred features hereinbefore described.

According to another aspect of the present invention there is provided a coupling means incorporating a device for multi-directional movement including one or more of the previously recited optional features.

According to one embodiment there is provided an exercise bike including the device with a cylindrical roller and the left and right side bearing means.

According to a further embodiment there is provided an apparatus having a joint incorporating the device.

According to a further embodiment the braking means comprises an electromagnetic which is able to apply a magnetic field to the housing to restrict or prevent movement of the roller.

It should be understood that multi-directional movement includes rotational movement, movement in a forward and reverse direction and linear movement.

The words "comprising, having, including" should be interpreted in an inclusive sense, meaning that additional features may also be added

BRIEF DESCRIPTION OF THE DRAWINGS

Preferred embodiments of the present invention will now be described by way of example only with reference to the accompanying drawings in which.

DETAILED DESCRIPTION OF THE DRAWINGS

Figure 1:
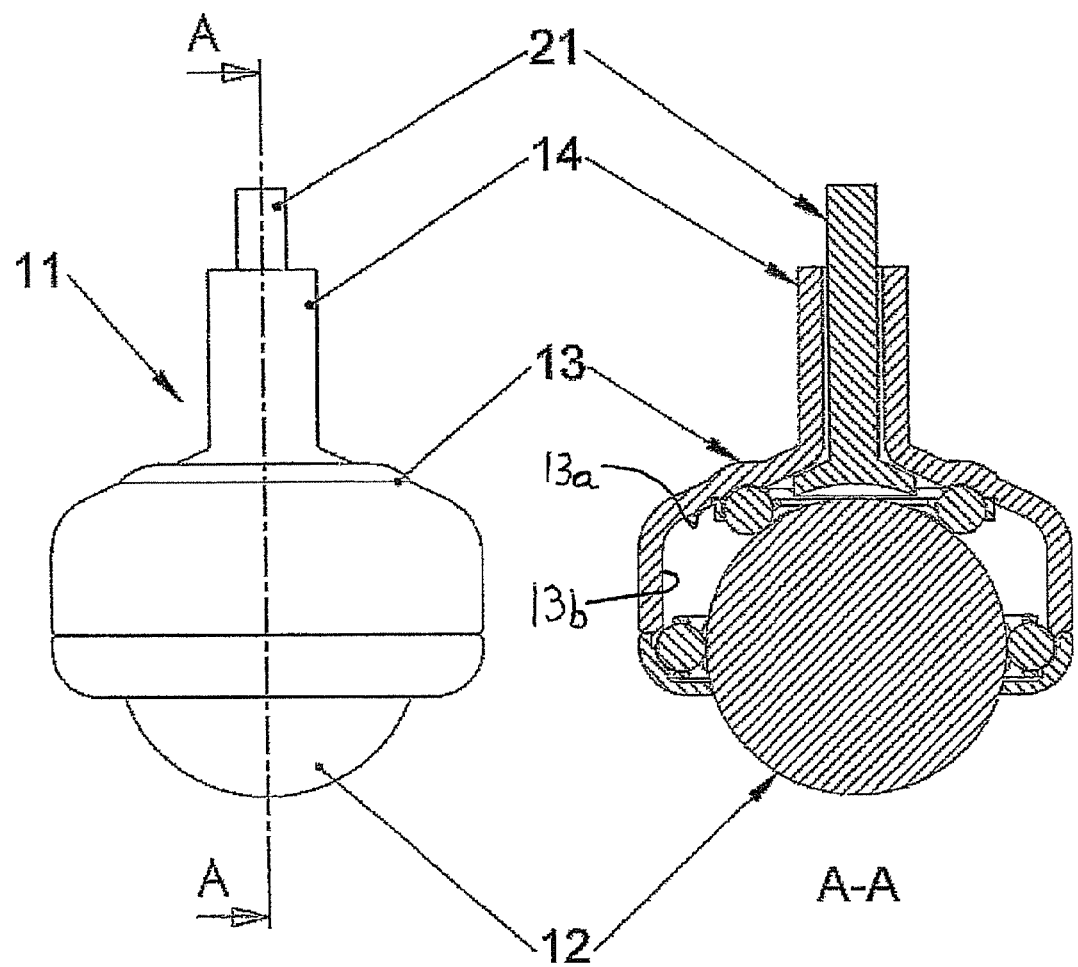
FIG. 1 shows a front sectional view of a device for providing multi-directional movement in accordance with a first embodiment of the present invention.

As shown in FIG. 1 a device for providing multi-directional movement is shown in the form of a castor wheel 11. The castor wheel consists of a spherical ball bearing 12 located within a housing 13 having an inverted cup shape with an upper apex extending into a vertical shank 14.

Figure 2:
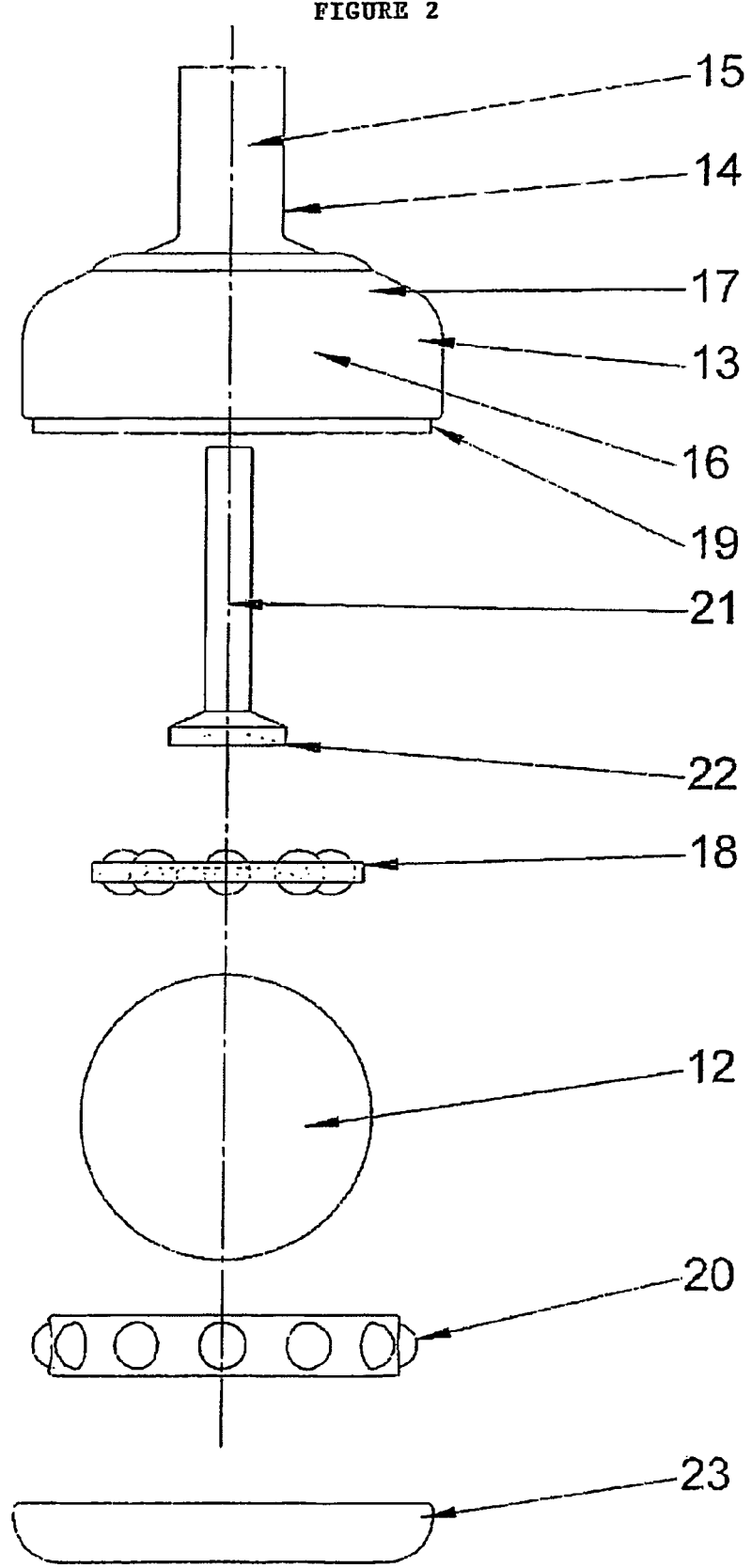
FIG. 2 shows disassembled components of the device shown in FIG. 1.

As shown in FIG. 2 the inside of the housing 13 is provided with an axial shaft 15 through the centre of the shank 14 which opens into a lower hemispherical chamber 16 for receipt of the roller 12.

The hemispherical chamber 16 includes an upper recessed circular region 17 for receipt of a race 18.

This circular region 17 is coaxial with the shaft 15 and a second recessed circular region 19 at the mouth of the chamber 16.

The second recessed circular region is located approximately at the equatorial region 19 of the hemispherical cavity 16 and consequently has a much wider width or diameter than the circular region 17. As illustrated, the housing 13 comprises an inclined tapering interior wall portion 13a and a generally vertical inner wall portion 13b, which together at least partially define the cavity 16 in which the spherical ball bearing 12 is located.

The second circular region 19 is configured to receive a large race and bearings 20.

In this embodiment the central shaft 15 flares outwardly at its lower end into the first circular region 17.

As shown in FIG. 1 the spherical ball 12 is located so that approximately less than half of its surface area is exposed below the bottom of the housing 13.

A top region of the ball 12 rests underneath the first race and bearings 18 and is able to move in any direction with respect to the bearings of that race.

The second race and bearings 20 located around the equatorial region of the ball 12 helps provide centring of the ball 12 and prevents the surface of the ball adjacent the inner wall of the housing 13 from contacting this wall.

The race and bearings 18 and 20 enable the ball 12 to freely move in any direction with minimal friction. Furthermore they enable the ball 12 to be housed within housing 13 without contacting its inner surface.

If a castor wheel having the features of the device shown in FIGS. 1 and 2 were used instead of existing castor wheels a shopping trolley for example would be able to move in any direction with minimal resistance to any force applied to the shopping trolley.

Likewise if the wheels were used in connection with a walking frame for a disabled person similar movement would be possible. In some cases however it is desirable to provide at least some resistance to movement to avoid uncontrollable movement of an article supported by the wheels.

The device therefore includes a braking mechanism consisting of a vertical rod 21 located through the shaft 15. The lower end of the rod 21 flares outwardly and incorporates a braking pad 22 or equivalent on its lower surface. By moving the member 21 downwardly the brake pad is forced downwardly through the race and bearings 18 into contact with the top surface of the ball 12. Depending upon the amount of contact between the brake pad and the ball 12 a variable amount of resistance to movement can be applied to the ball 12.

The braking mechanism may also be located through the other part of the housing and may include more than one member 21. Furthermore the brake pad may be replaceable and may contact a different part of the ball 12.

A screw mechanism may be used to change the amount of contact between the braking mechanism and the ball 12. Alternatively the braking mechanism may incorporate a spring which naturally urges the member 21 downwardly into contact with the ball 12.

According to another embodiment an electromagnet may be incorporated into the housing or on top of the housing to apply a magnetic field to prevent relative rotation between the bearings of the races 18 and 20 and the ball 12.

It is noted that the race 18 preferably consists of an annular flat ring with equispaced holes configured to receive roller bearings. Each of the holes are preferably tapered inwardly so that the roller bearings cannot pass all the way through them. In this way the roller bearings protrude beyond the upper and lower faces of the annular ring and are able to contact the upper ring surface of the roller 12 and the lower surface of an upper component of the race 18.

It is also noted that the lower race 20 is held in place by a circlip 23 or a lower skirting device which is able to be screwed into the bottom of the housing 13.

Figure 3:
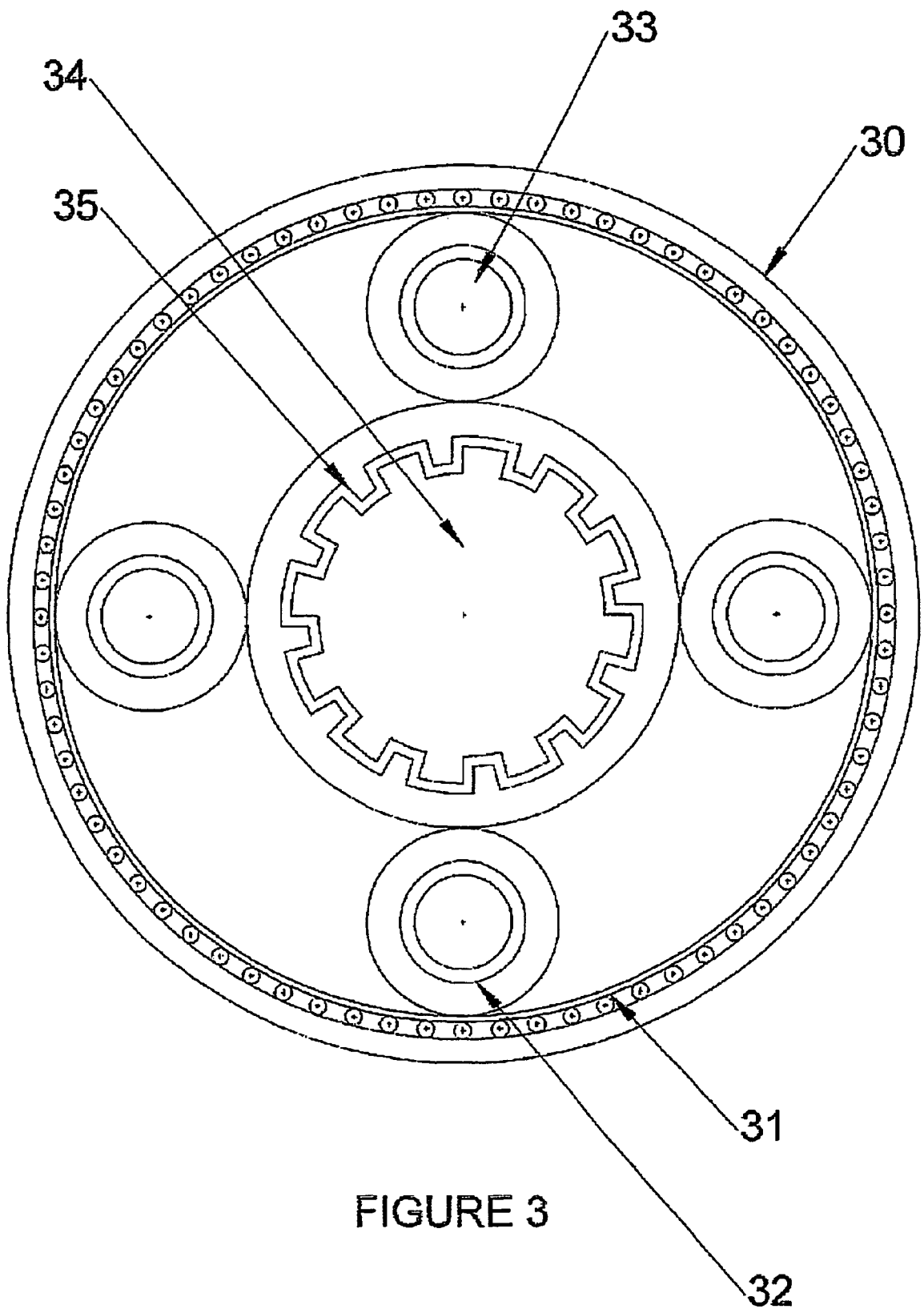
FIG. 3 shows a bottom view of a device for providing multi-directional movement according to a second embodiment of the present invention.

In the second embodiment of the invention shown in FIG. 3 an annular housing 30 is provided with a race and bearings 31 enclosing four equispaced rollers 32 each supported from above by an upper race and bearings 34 in a similar fashion to that shown in FIG. 1. A drive shaft 34 is located in the centre of the housing and the roller balls 32 are able to rotate around the shaft 34 but within the confines of the housing and race 30, 31.

The internal shaft 34 incorporates teeth 35 and enables either relative rotation of the rollers 32 with respect to the shaft 34 or driven movement when the shaft 34 engages part of an inner central bore 35 through the centre of the housing 30. It follows that this embodiment has many applications in machinery requiring articulation between different components.

Figure 4:
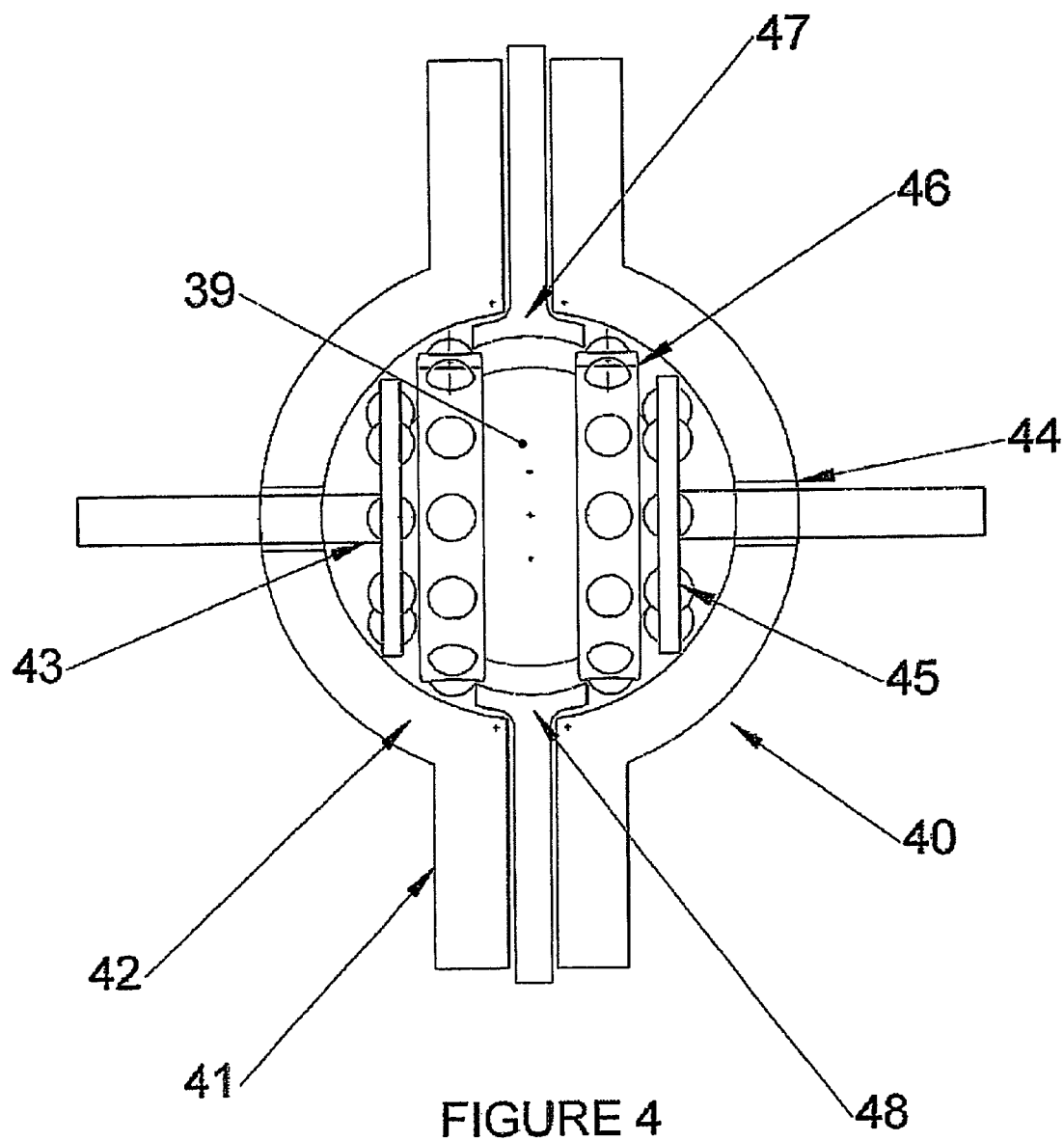
FIG. 4 shows a top sectional view of a device for providing multi-directional movement according to a third embodiment of the present invention.

The third embodiment of the invention shown in FIG. 4 consists of a generally spherical housing having an upper hemisphere and lower hemisphere 42. A spherical roller 43 is housed inside the housing 40 and has an axial hole 43 diametrically therethrough and extending horizontally in alignment with horizontal holes through the equatorial region 44 of the housing 40. The housing 40 incorporates races and bearings 45, 46 on left and right sides thereof. These races although arranged vertically operate in a similar fashion to races and bearings 18 and 20 of the first embodiment of the invention.

A shaft extends through the central bore 43 and holes 44 and is provided with pedals on either end.

At the top and bottom of the housing, braking mechanisms 47, 48 extend through vertical shafts in the housing 40. The braking mechanisms 47, 48 operate in a similar fashion to the braking mechanism 21 shown in FIG. 1. A force applied downwardly to braking mechanism 47 or upwardly to braking mechanism 48 applies a braking force to the ball 39 and the amount of braking force can be adjusted to increase or decrease the ease with which the ball 39 can rotate due to a pedaling action applied to each of the pedals (not shown).

From the above it can be seen that the device shown in FIG. 4 may be used in an exercise bicycle to control the amount of resistance to rotation of the ball 39.

Figure 5:
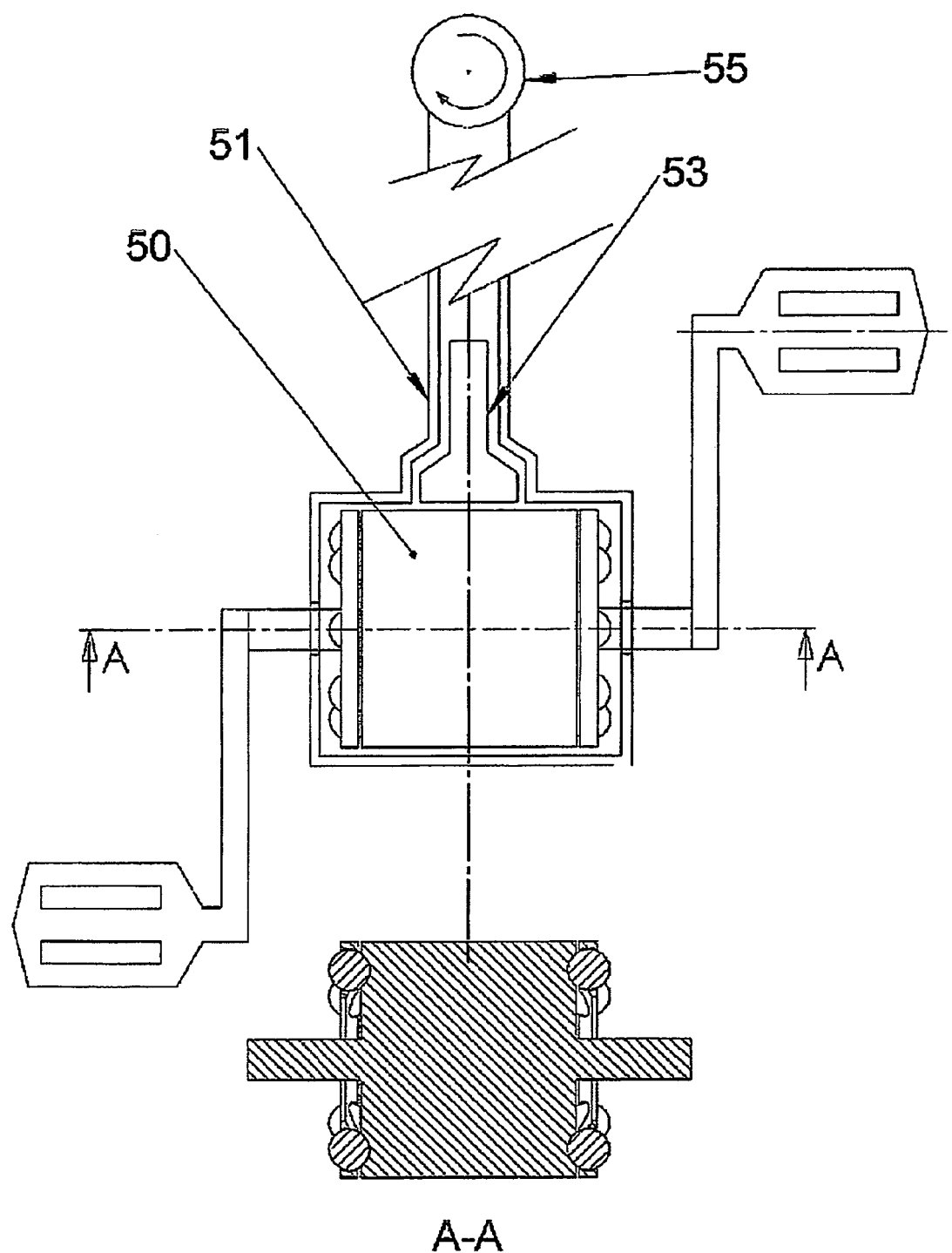
FIG. 5 shows an angled view of the device shown in FIG. 4.

The device may also be modified to that shown in FIG. 5 in which the ball is replaced by a cylindrical bearing 50 located within housing 51. In this Figure a single braking mechanism 53 is shown which may be operated by twisting a knob 55 in the centre of handle bars 54 to vary the braking force applied to the cylindrical roller bearing 50. Therefore by operating the pedals 52 a person riding the bicycle machine is able to provide greater or lesser resistance to rotate the roller bearing 50.

The principle employed by the embodiment in FIGS. 4 and 5 is equally applicable to other devices such as vehicles in which a braking force may be applied to prevent rotation of wheels, by applying the braking force directly to the roller which allows mobility.

It is to be understood that, if any prior art publication is referred to herein, such reference does not constitute an admission that the publication forms a part of the common general knowledge in the art, in Australia or in any other country.

The invention claimed is:

1. A device for providing multi-directional movement comprising:
    a housing having at least one main roller located therein, the housing having a first end defining an opening through which a part of the main roller extends, and a tapering second end, wherein the second end and a generally vertical inner wall portion of the housing define a cavity in which the main roller is located, the second end comprising a second-end wall portion which is inclined relative to the generally vertical inner wall portion of the housing;
    at least one bearing means comprising an annular member with a plurality of openings in which support rollers are located for contacting a surface part of the or each main roller, the surface part being a surface part of the roller oriented towards the second end of the housing, and wherein at least some of the support rollers are seated in the openings so that parts of their surfaces protrude further towards the first end of the housing than does the annular member in which they are located;
    a recessed circular region, provided in the inclined second-end wall portion, for accommodating the support rollers, the recessed circular region being spaced apart inwardly from, and having a substantially smaller diameter than, the generally vertical inner wall portion of the housing;
    a centring mechanism for preventing contact between the main roller and the inner wall portion of the housing and comprising a plurality of centring rollers for contacting a peripheral portion of the or each main roller;
    retainer for retaining the centring mechanism in position in the housing around the or each main roller; and
    brake for providing resistance to rotation of at least one main roller.

2. The device as claimed in claim 1 wherein the or each annular member is located between the or each main roller and the second end of the housing.

3. The device as claimed in claim 1 wherein all the support rollers are seated so that parts of their surfaces protrude further towards the first end of the housing than does the annular member in which they are located.

4. The device as claimed in claim 1 wherein at least some of the support rollers are seated so that parts of their surfaces protrude further towards the second end of the housing than does the annular member in which they are located.

5. The device as claimed in claim 4 wherein the brake comprises a brake pad located above the bearing means and configured to contact a top surface of at least one main roller.

6. The device as claimed in claim 5 wherein the brake is able to be forced by an urging means mechanism through the annular member into contact with the main roller.

7. The device as claimed in claim 1 wherein the openings each comprise a hole through the annular member which has a diameter which varies in the direction of thickness of the annular member and which has a minimum diameter which is less than the diameter of the support roller located therein.

8. The device as claimed in claim 1 wherein the retainer is screwed into the bottom of the housing.

9. The device as claimed in claim 8 wherein the centring mechanism comprises a peripheral race with the plurality of centring rollers located therein to contact the peripheral portion of the or each main roller.

10. The device as claimed in claim 9 wherein the retainer comprises a skirting device which is able to be screwed into the bottom of the housing.

11. The device as claimed in claim 9 wherein the retainer comprises a circlip.

12. The device as claimed in claim 1 wherein the centring housed in a circular recessed region of the housing located approximately at the equatorial region of the one or more main rollers.

13. The device as claimed in claim 12, wherein the main roller is a spherical ball.

14. The device as claimed in claim 1 wherein the brake comprises a braking member which is configured to be urged into contact with at least one main roller.

15. The device as claimed in claim 1 wherein the main roller is able to move in any direction.

* * * * *